United States Patent
Meyer

(10) Patent No.: US 6,667,002 B1
(45) Date of Patent: Dec. 23, 2003

(54) METHOD FOR MOLDING A SWIVEL HINGE

(75) Inventor: Charles Meyer, New Lenox, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/443,265

(22) Filed: Nov. 22, 1999

Related U.S. Application Data

(60) Division of application No. 09/276,035, filed on Mar. 25, 1999, now Pat. No. 6,053,458, which is a continuation-in-part of application No. 09/004,432, filed on Jan. 8, 1998, now Pat. No. 5,984,242.

(51) Int. Cl.$^7$ .............................................. B29C 45/00
(52) U.S. Cl. ..................... 264/138; 264/232; 264/242; 264/328.8; 249/98; 249/119
(58) Field of Search ................................ 264/138, 242, 264/232, 328.8, 152; 249/119, 64, 98

(56) References Cited

U.S. PATENT DOCUMENTS

| | | | |
|---|---|---|---|
| 2,445,475 A | 7/1948 | Durant | |
| 2,556,491 A | 6/1951 | DeLorenzo | |
| 3,069,105 A | * 12/1962 | Press et al. | 242/55.2 |
| 3,995,822 A | * 12/1976 | Einhorn et al. | 248/304 |
| 4,049,231 A | * 9/1977 | Lutz | 425/438 |
| 4,114,849 A | * 9/1978 | von Holdt | 249/58 |
| 4,172,577 A | * 10/1979 | von Holdt | 249/58 |
| 4,192,441 A | 3/1980 | Batts | |
| 4,277,864 A | 7/1981 | Orson | |
| 4,579,709 A | * 4/1986 | Ferreri | 264/242 |
| 4,632,357 A | * 12/1986 | von Holdt | 249/58 |
| 4,653,951 A | 3/1987 | Bodle et al. | |
| 4,886,228 A | 12/1989 | Kennedy | |
| 5,184,794 A | 2/1993 | Saito | |
| 5,494,245 A | 2/1996 | Suzuki et al. | |
| 5,984,242 A | 11/1999 | Meyer | |

FOREIGN PATENT DOCUMENTS

| | | |
|---|---|---|
| DE | 39 08479 A1 | 9/1989 |
| EP | 0 681 133 A3 | 11/1995 |
| EP | 0 681 133 A2 | 11/1995 |
| FR | 2 618 839 | 2/1989 |
| GB | 2 131 870 A | 6/1984 |

* cited by examiner

Primary Examiner—Edmond H. Lee
(74) Attorney, Agent, or Firm—Pitney, Hardin, Kipp & Szuch LLP

(57) ABSTRACT

The swivel hinge includes a swivel element with apertures and a base element with a swivel shaft which is journaled for rotation within the apertures. The apertures include radially inwardly extending fingers which position the swivel shaft and are formed as molding gates for molding windows which are provided in common for initially molding the base element and the swivel member as a single integral piece. Subsequent rotation breaks the molding gates and the vestiges form the fingers.

5 Claims, 3 Drawing Sheets

METHOD FOR MOLDING A SWIVEL HINGE

This application is a divisional of application Ser. No. 09/276,035 filed Mar. 25, 1999, now U.S. Pat. No. 6,053,458, which is a continuation-in-part of application Ser. No. 09/004,432, filed on Jan. 8, 1998, now U.S. Pat. No. 5,984,242, entitled "One-Piece Swivel Clip".

BACKGROUND OF THE INVENTION

1. Field of the Invention

This invention pertains to a swivel hinge for a clip including a base member with an initially integrally molded swivel member. Common molding windows are configured in the swivel hinge to provide internal gates to fill both members during the molding process. The internal gates are broken prior to use to allow the swivel member to rotate with respect to the base member.

2. Description of the Prior Art

In the prior art, swivel hinges for clips are frequently molded as three separate pieces—a base element, a swivel element and a hinge pin—which are assembled after molding. Similarly, some designs include a strap hinge with secondary retention features, such as banana prongs, which may result in a larger clip than desired. However, it may be desired to provide swivel hinges with greater strength and reusability than has been typical with some of the prior art designs. For instance, snap fit designs typically require a high insertion force to maintain a marginally acceptable retention force.

Examples of prior art in this field include U.S. Pat. No. 5,494,245 to Suzuki et al. entitled "Wireless Harness Retainer Clip"; U.S. Pat. No. 5,184,794 to Saito entitled "Rod Holder"; U.S. Pat. No. 4,886,228 to Kennedy entitled "Adjustable Mounting Bracket"; U.S. Pat. No. 4,653,951 to Bodle et al. entitled "Zero Free-Play Joint for Deployable Space Structures"; U.S. Pat. No. 4,227,864 to Orson, Sr. entitled "Spring Operated Clip"; U.S. Pat. No. 4,192,441 to Batts entitled "Clamp Construction for Article Hangers"; U.S. Pat. No. 2,556,491 to Lorenzo entitled "Clamping Cam Lug for Electrical Connections"; and U.S. Pat. No. 2,445,475 to Durant entitled "Clamp".

OBJECTS AND SUMMARY OF THE INVENTION

It is therefore an object of this invention to provide a swivel hinge for a clip which is initially molded as a single piece.

It is therefore a further object of this invention to provide a swivel hinge for a clip with simplified assembly.

It is therefore a still further object of this invention to provide a swivel hinge for a clip with increased strength.

It is therefore a still further object of this invention to provide a swivel hinge for a clip with increased reusability.

It is therefore a still further object of this invention to provide a swivel hinge for a clip which results in a clip of compact design.

It is therefore a final object of this invention to provide a swivel hinge for a clip with low manufacturing and assembly costs.

These and other objects are attained by the present invention by providing a swivel hinge for a clip wherein the base member and the swivel member are initially integrally molded. During the molding process, common molding windows are configured to provide internal gates to fill both the base member and the swivel member. After the molding process, the members are rotated to break the internal gates, thereby allowing the swivel action.

The base member typically includes the clip body and the swivel shaft, as well as the components to secure the base member to an external structure. The swivel member typically includes the clip lid, the swivel shaft bore and internal gates. Inwardly radially extending fingers, which thicken outwardly, are formed from the vestiges of the molding gates on the swivel apertures of the swivel element and serve to position the bore with respect to the swivel shaft on the base element. The swivel member generally cannot be removed from the base member without destroying the clip. Windows are used to form the swivel shaft and its accompany bore. A variety of window, shaft and gate configurations are possible. As axial clearance between both members is necessary for tooling, but undesirable once the clip is closed, ramps are formed on both members to eliminate this axial clearance as the clip closes. A cam on the swivel member is used to eliminate a similar front-to-rear tooling clearance, thereby reducing the ultimate loads on the swivel shaft. Stops are positioned on both member to limit the range of rotation of the swivel member with respect to the base member.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
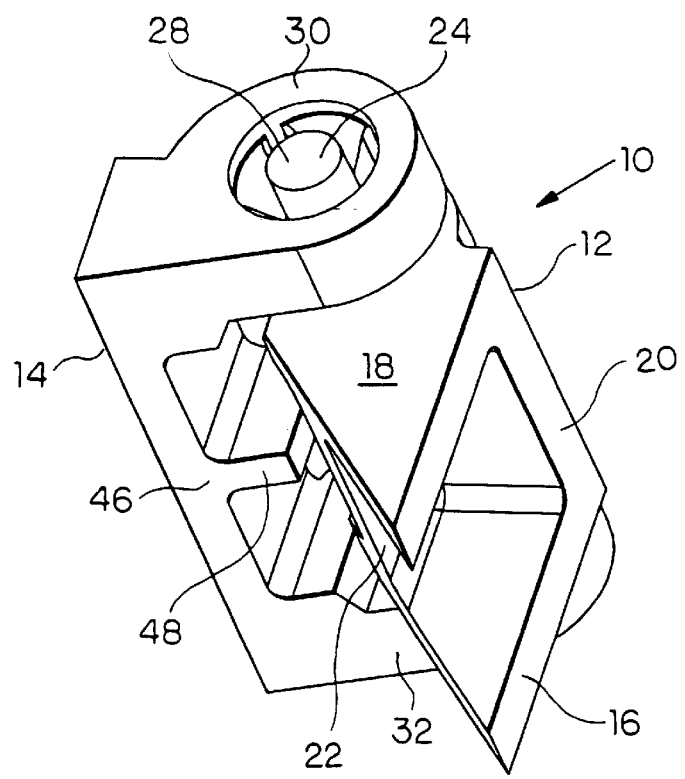
FIG. 1 is a perspective view of the swivel hinge of the present invention.

Referring now for the drawings in detail, wherein like numerals refer to like elements throughout the several views, one sees that FIGS. 1–4 are various views of swivel hinge assembly 10 of the present invention. Swivel hinge assembly 10 is incorporated into clip 100 as shown in FIG. 5. Swivel hinge assembly 10 includes base element 12 and swivel element 14 in pivotable relationship to each other subsequent to initial integral molding and rotation as will be described hereinafter. It is envisioned that the configuration of the base element 12 and swivel element 14 may be reversed for some applications.

Base element 12 includes planar side supports 16, 18 which are parallel to each other and separated by interior horizontal support 20 and exterior vertical support 22. As will be explained hereinafter, exterior vertical support 22 further serves as a reverse rotational stop. The terms "vertical" and "horizontal" apply to the orientation of swivel hinge assembly 10 shown in FIGS. 4 and 5. Swivel shaft 24 is formed integrally upon interior horizontal support 20 and further includes axle ends 26, 28 which extend from planar side supports 16, 18, respectively.

Figure 2:
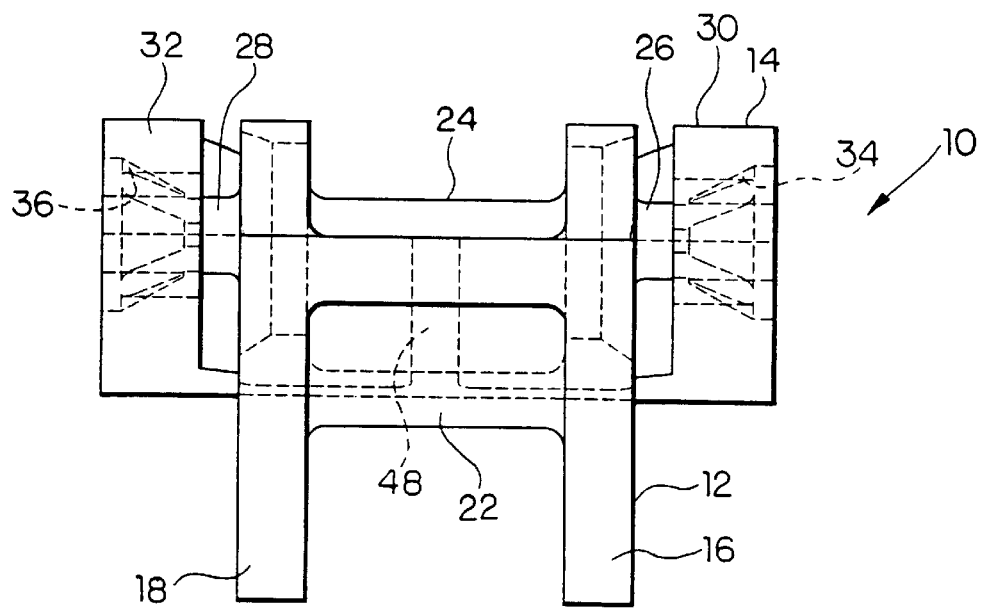
FIG. 2 is a rear plan view, partially in phantom, of the swivel hinge of the present invention in the closed position.
Figure 3:
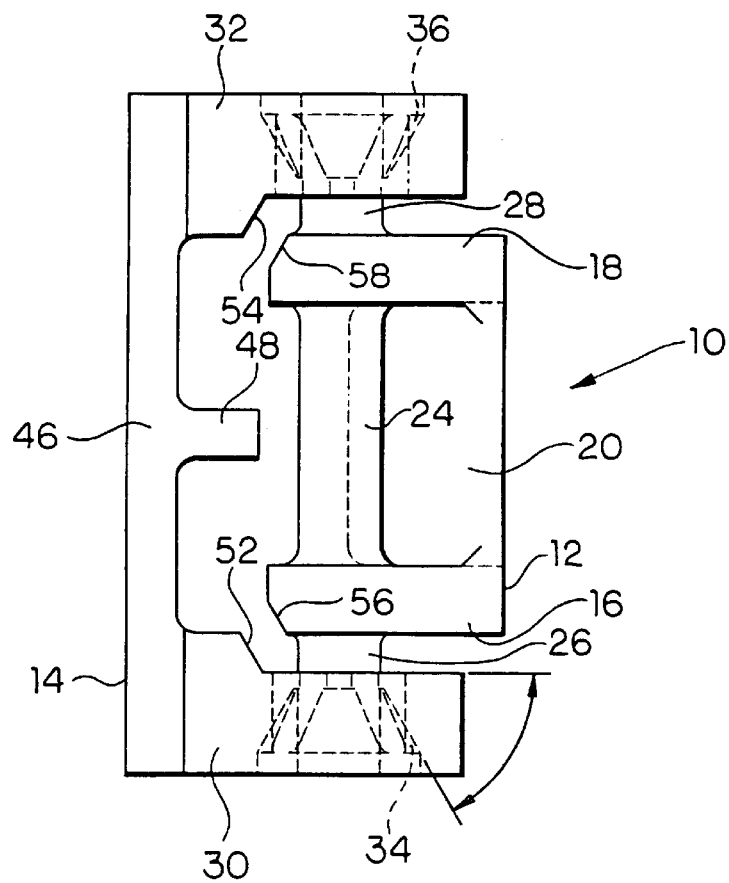
FIG. 3 is a top plan view, partially in phantom, of the swivel hinge of the present invention.

Swivel element 14 includes planar swivel bore supports 30, 32 in which swivel bores 34, 36, respectively, are formed. Axle ends 26, 28 are journaled for rotation within swivel bores 34, 36, respectively. As can be seen from the phantom portions of FIGS. 2 and 3, swivel bores 34, 36 are conically flared to an enlarged diameter at an exterior of swivel bore supports 30, 32 and include radially inwardly extending fingers 38, 40, 42, 44 (see FIG. 4) to engage axle ends 26, 28. Radially inwardly extending fingers 38, 40, 42, 44 thicken in the outward direction as can be seen in FIGS. 2 and 3. During the molding process, common molding windows are formed at the intersection of radially inwardly extending fingers 38, 40, 42, 44 and axle ends 26, 28, and the molding gates form radially inwardly extending fingers 38, 40, 42, 44. This initially results in an integral piece. However, the molding gates are broken by rotating swivel element 14 with respect to base element 12 resulting in swivel hinge assembly 10 and clip 100. The resulting radially inwardly extending fingers 38, 40, 42, 44 keep swivel bores 34, 36 centered on axle ends 26, 28. The resulting swivel hinge assembly 10 generally cannot be disassembled without destroying swivel hinge assembly 10.

Planar swivel bore supports 30, 32 are separated by planar support 46. The central portion of planar support 46 includes inwardly protruding reverse rotational stop 48 to limit the range of motion of base element 12 with respect to swivel element 14. In other words, when swivel element 14 is rotated to an open position, inwardly protruding reverse rotational stop 48 of swivel element 14 abuts exterior vertical support 22.

Figure 4:
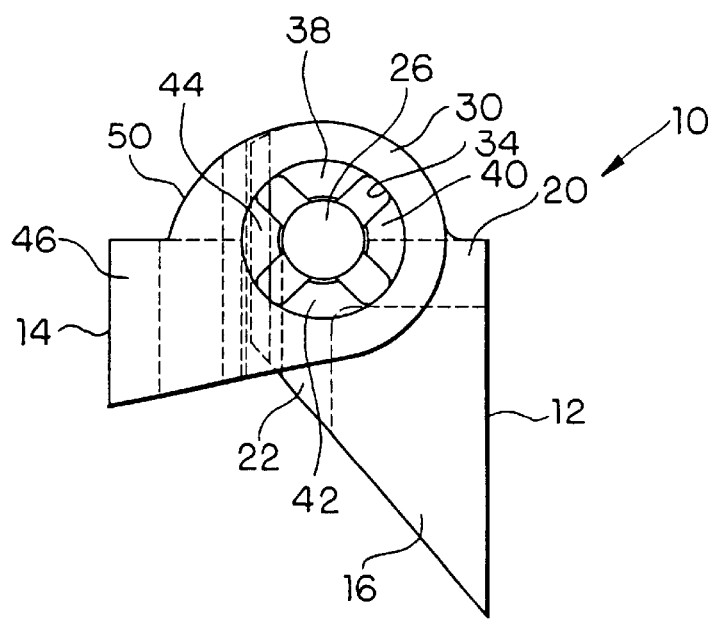
FIG. 4 is a side plan view, partially in phantom, of the swivel hinge of the present invention.
Figure 5:
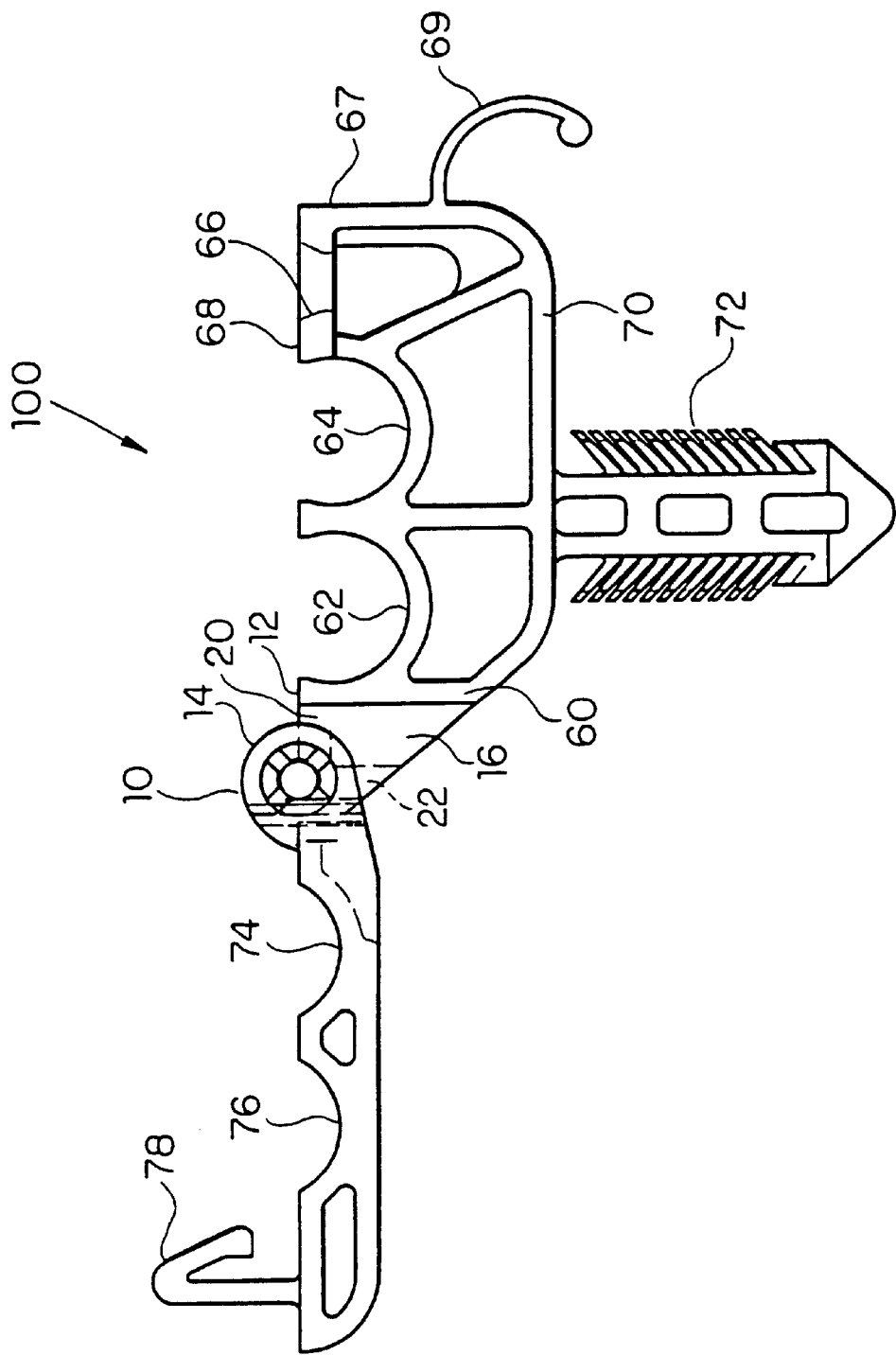
FIG. 5 is a side plan view, partially in phantom, of a clip using the swivel hinge of the present invention, the clip being in an open position.

As shown in FIG. 4, the portion of planar swivel bore support 30 radially outward from swivel bore 34 and adjacent to planar support 46 is thickened thereby forming camming wall 50 to eliminate fore/aft tooling clearance and reducing the ultimate loads on swivel shaft 24. Similarly, as shown on FIG. 3, swivel element axial ramps 52, 54 are formed on the interior of planar swivel bore supports 30, 32, respectively, somewhat adjacent to planar support 46. Swivel element axial ramps 52, 54 face base element axial ramps 56, 58 which are formed on planar side supports 16, 18, respectively. This ramp configuration provides the necessary axial clearance between base element 12 and swivel element 14 for tooling in a relatively open position of base element 12 and swivel element 14, but eliminates this axial clearance in a relatively closed position of base element 12 and swivel element 14.

FIG. 5 illustrates a typical clip 100 which can be formed using swivel hinge assembly 10. However, those skilled in the art will realize that many different designs are possible. Planar side supports 16, 18 of base element 12 join vertical wall 60 which is integral with tubular engaging portion 62 which is adjacent to tubular engaging portion 64, both tubular engaging portions 62, 64 having circular sections greater than 180° in order to engage a tube or similar device (not shown). Detent aperture 66 is formed adjacent to tubular engaging portion 64 on upper surface 68. Lower surface 70 includes tree fastener section 72 which is disclosed in allowed U.S. patent application Ser. No. 09/028,889, filed on Feb. 24, 1998, entitled "Tree Fastener with Split Wings", the disclosure of which is hereby incorporated by reference. Tree fastener section 72 is typically used to engage clip 100 to an aperture (not shown) in a fixed structure element (not shown). Front surface 67 of base element 12 further includes fin 69 for stabilizing clip 100 and, optionally, for engaging an edge of a sheet metal structure (not shown).

Swivel element 14 includes two tubular engaging portions 74, 76 with circular sections which are less than 180°, and which, in the closed position of clip 100, align with tubular engaging portions 62, 64, respectively, to form 360° tubular engaging sections. Swivel element 14 further includes detent hook 78 which engages detent aperture 66 when clip 100 is in the closed position.

Clip 100 is initially molded in an integral configuration in a relatively open position, with common molding windows formed at the intersection of radially inwardly extending fingers 38, 40, 42, 44 and axle ends 26, 28 of swivel shaft 24 and molding gates forming radially inwardly extending fingers 38, 40, 42, 44. The molding in a relatively open position allows for the necessary axial clearance between base element 12 and swivel element 14 for tooling.

To install clip 100, swivel element 14 is rotated with respect to base element 12 thereby breaking the molding gates and leaving radially inwardly extending fingers 38, 40, 42, 44 as vestiges. Clip 100 is typically installed by inserting tree fastener section 72 into aperture (not shown) of stationary structure (not shown). Tubular devices (not shown), such as cables, are inserted into tubular engaging swivel portions 62, 64. Swivel element 14 is then swiveled to a closed position so that tubular engaging portions 74, 76 align with tubular engaging portions 62, 64, respectively, and detent hook 78 engages detent aperture 66 thereby engaging the tubular device.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A method of molding a swivel hinge including the elements of a relatively stationary base element and a relatively rotatable swivel element, the method comprising the steps of:

providing a mold with a first mold portion for forming said base element and a second mold portion in communication with said first mold portion for forming said swivel element, wherein a first of said base element and said swivel element includes a swivel shaft and a second of said base element and said swivel element includes two apertures about which said swivel shaft is journaled, said swivel shaft providing an axis of rotation with respect to said apertures, said two apertures including outwardly conically flared walls and radially inwardly extending fingers which thicken in an outward direction within said outwardly conically flared walls for positioning said swivel shaft;

providing said mold with common molding windows for forming molding gates which initially form said inwardly extending fingers integrally with said swivel shaft; and performing a molding step including providing material to form said swivel hinge wherein said swivel element is formed integrally with said base element, the swivel element being subsequently rotatable with respect to the said base element after said molding gates are broken.

2. The method of claim 1 wherein said step of providing a mold includes providing said swivel shaft in said base element and providing said two apertures in said swivel element.

3. A method of molding a swivel hinge including the elements of a relatively stationary base element and a relatively rotatable swivel element, the method comprising the steps of:

providing a mold with a first mold portion for forming said base element and a second mold portion in communication with said first mold portion for forming said swivel element, wherein a first of said base element and said swivel element includes a swivel shaft and a second of said base element and said swivel element includes two spaced apart coaxial apertures about which said swivel shaft is journaled for rotation, said swivel shaft passing through said two spaced apart coaxial apertures and providing an axis for rotation thereabout, said two spaced apart coaxial apertures including outwardly conically flared walls and radially inwardly extending fingers which thicken in an outward direction within said outwardly conically flared walls for positioning said swivel shaft;

providing said mold with common molding windows for forming molding gates which initially form said inwardly extending fingers integrally with said swivel shaft; and performing a molding step including providing material to form said swivel hinge wherein said swivel element is formed integrally with said base element, the swivel element being subsequently rotatable with respect to the said base element after said molding gates are broken.

4. The method of claim 3 wherein said step of providing a mold includes providing said swivel shaft in said base element and providing said two spaced apart coaxial apertures in said swivel element.

5. A method of molding a swivel hinge including the elements of a relatively stationary base element and a relatively rotatable swivel element, the method comprising the steps of:

providing a mold with a first mold portion for forming said base element and a second mold portion in communication with said first mold portion for forming said swivel element, wherein said base element includes a swivel shaft and said swivel element includes two spaced apart apertures with a common axis about which said swivel shaft is journaled for rotation, said swivel shaft extending along said common axis and passing through said two spaced apart apertures and providing an axis for rotation thereabout, said two spaced apart apertures including outwardly conically flared walls and radially inwardly extending fingers which thicken in an outward direction within said outwardly conically flared walls for positioning said swivel shaft, said swivel shaft further including enlarged central portions to substantially prevent said swivel shaft from moving longitudinally along said common axis;

providing said mold with common molding windows for forming molding gates which initially form said inwardly extending fingers integrally with said swivel shaft; and performing a molding step including providing material to form said swivel hinge wherein said swivel element is formed integrally with said base element, the swivel element being subsequently rotatable with respect to the said base element after said molding gates are broken.

* * * * *